US012643768B2

(12) United States Patent
Depaola et al.

(10) Patent No.: US 12,643,768 B2
(45) Date of Patent: Jun. 2, 2026

(54) PRECISE PASSENGER LOCATION TRACKING FOR ELEVATOR ACCESS AND DISPATCHING

(71) Applicant: OTIS ELEVATOR COMPANY, Farmington, CT (US)

(72) Inventors: Peter Depaola, Glastonbury, CT (US); Wade A. Montague, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1048 days.

(21) Appl. No.: 17/537,058

(22) Filed: Nov. 29, 2021

(65) Prior Publication Data

US 2023/0166944 A1 Jun. 1, 2023

(51) Int. Cl.
| | |
|---|---|
| *B66B 1/46* | (2006.01) |
| *G01S 13/87* | (2006.01) |
| *H04W 4/02* | (2018.01) |

(52) U.S. Cl.
CPC ............ *B66B 1/468* (2013.01); *G01S 13/878* (2013.01); *H04W 4/023* (2013.01);
(Continued)

(58) Field of Classification Search
CPC .................. B66B 1/468; B66B 1/3461; B66B 2201/101; B66B 2201/4638; B66B 2201/4653
See application file for complete search history.

(56) References Cited

U.S. PATENT DOCUMENTS

| | | | | |
|---|---|---|---|---|
| 7,377,364 | B2 * | 5/2008 | Tyni | ........................ B66B 1/468 |
| | | | | 187/391 |
| 7,387,194 | B2 * | 6/2008 | Skolnick | ................. B66B 25/00 |
| | | | | 198/322 |

(Continued)

FOREIGN PATENT DOCUMENTS

| | | |
|---|---|---|
| CN | 106335822 A | 1/2017 |
| WO | 2021194136 A1 | 9/2021 |

OTHER PUBLICATIONS

Chinese Office Action for Application No. 202210685539.X, Issued Mar. 23, 2024, 20 pages.

(Continued)

*Primary Examiner* — Rina I Duda

(74) *Attorney, Agent, or Firm* — CANTOR COLBURN LLP

(57) ABSTRACT

A method of calling an elevator car for an elevator system including: transmitting, using a first beacon, a first poll wireless signal, the first poll wireless signal having a first poll transmission speed; receiving, using the first beacon, a first response wireless signal from a passenger mobile device in response to the first poll wireless signal, the first response wireless signal having a first response transmission speed; determining a first time of flight between transmission of the first poll wireless signal from the first beacon and receipt of the first response wireless signal at the first beacon; calculating a first distance between the first beacon and the passenger mobile device based on the first time of flight, the first poll transmission speed, and the first response transmission speed; and determining a location of the passenger mobile device based on at least the first distance.

21 Claims, 4 Drawing Sheets

(52) U.S. Cl.
CPC .................. *B66B 2201/101* (2013.01); *B66B 2201/4638* (2013.01); *B66B 2201/4653* (2013.01)

(56)  References Cited

U.S. PATENT DOCUMENTS

| | | | |
|---|---|---|---|
| 8,253,548 B2 * | 8/2012 | Oh ........................... | B66B 1/34 294/102.2 |
| 8,485,317 B2 * | 7/2013 | Gerstenkorn ........... | B66B 1/468 187/247 |
| 9,051,155 B2 * | 6/2015 | Herkel ................... | B66B 5/027 |
| 9,382,095 B2 * | 7/2016 | Rusanen ................ | B66B 1/468 |
| 9,463,955 B2 * | 10/2016 | Preston .................. | B66B 3/002 |
| 9,957,132 B2 * | 5/2018 | Berryhill ................ | B66B 1/468 |
| 9,998,581 B1 * | 6/2018 | Noxon ............. | H04M 1/72412 |
| 10,472,207 B2 * | 11/2019 | Baldi ................... | B66B 5/0025 |
| 10,640,329 B2 * | 5/2020 | Simcik ................. | H04W 4/023 |
| 2014/0027208 A1 * | 1/2014 | Schwarzentruber ...... | B66B 1/14 187/391 |
| 2016/0251199 A1 * | 9/2016 | Kronkvist .............. | B66B 1/468 187/381 |
| 2016/0284147 A1 * | 9/2016 | Trani ........................ | G01S 5/02 |
| 2020/0165099 A1 * | 5/2020 | Kuenzi ................ | B66B 1/3461 |

OTHER PUBLICATIONS

European Search Report for Application No. 22181671.1, Issued Dec. 23, 2022, 9 Pages.

\* cited by examiner

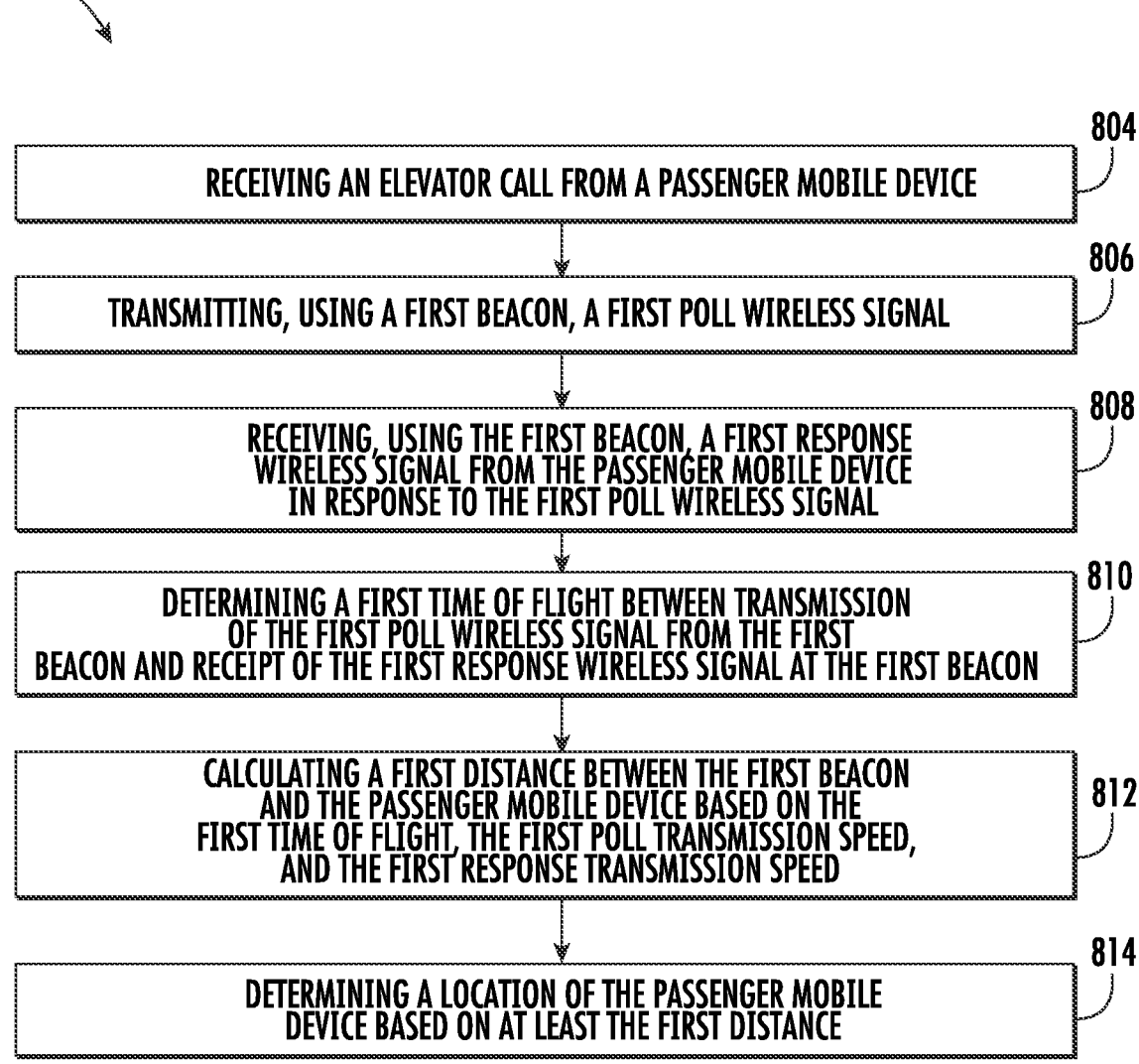

800

804

RECEIVING AN ELEVATOR CALL FROM A PASSENGER MOBILE DEVICE

806

TRANSMITTING, USING A FIRST BEACON, A FIRST POLL WIRELESS SIGNAL

808

RECEIVING, USING THE FIRST BEACON, A FIRST RESPONSE
WIRELESS SIGNAL FROM THE PASSENGER MOBILE DEVICE
IN RESPONSE TO THE FIRST POLL WIRELESS SIGNAL

810

DETERMINING A FIRST TIME OF FLIGHT BETWEEN TRANSMISSION
OF THE FIRST POLL WIRELESS SIGNAL FROM THE FIRST
BEACON AND RECEIPT OF THE FIRST RESPONSE WIRELESS SIGNAL AT THE FIRST BEACON

812

CALCULATING A FIRST DISTANCE BETWEEN THE FIRST BEACON
AND THE PASSENGER MOBILE DEVICE BASED ON THE
FIRST TIME OF FLIGHT, THE FIRST POLL TRANSMISSION SPEED,
AND THE FIRST RESPONSE TRANSMISSION SPEED

814

DETERMINING A LOCATION OF THE PASSENGER MOBILE
DEVICE BASED ON AT LEAST THE FIRST DISTANCE

FIG. 3

PRECISE PASSENGER LOCATION TRACKING FOR ELEVATOR ACCESS AND DISPATCHING

BACKGROUND

The subject matter disclosed herein relates generally to the field of elevator call systems, and specifically to a method and apparatus for determining a location of a passenger submitting an elevator call.

Elevator systems are typically only able to generate an elevator call based on an individual manually entering an elevator call on an elevator call button in a wall next to an elevator bank.

BRIEF SUMMARY

According to an embodiment, a method of calling an elevator car for an elevator system is provided. The method including: transmitting, using a first beacon, a first poll wireless signal, the first poll wireless signal having a first poll transmission speed; receiving, using the first beacon, a first response wireless signal from a passenger mobile device in response to the first poll wireless signal, the first response wireless signal having a first response transmission speed; determining a first time of flight between transmission of the first poll wireless signal from the first beacon and receipt of the first response wireless signal at the first beacon; calculating a first distance between the first beacon and the passenger mobile device based on the first time of flight, the first poll transmission speed, and the first response transmission speed; and determining a location of the passenger mobile device based on at least the first distance.

In addition to one or more of the features described herein, or as an alternative, further embodiments may include moving the elevator car to the location of the passenger mobile device.

In addition to one or more of the features described herein, or as an alternative, further embodiments may include that the first poll wireless signal and the first response wireless signal are each Ultra-Wideband wireless signals.

In addition to one or more of the features described herein, or as an alternative, further embodiments may include: transmitting, using a second beacon, a second poll wireless signal, the second poll wireless signal having a second poll transmission speed; receiving, using the second beacon, a second response wireless signal from the passenger mobile device in response to the second poll wireless signal, the second response wireless signal having a second response transmission speed; determining a second time of flight between transmission of the second poll wireless signal from the second beacon and receipt of the second response wireless signal at the second beacon; calculating a second distance between the second beacon and the passenger mobile device based on the second time of flight, the second poll transmission speed, and the second response transmission speed; and determining the location of the passenger mobile device based on at least the first distance and the second distance.

In addition to one or more of the features described herein, or as an alternative, further embodiments may include: transmitting, using a third beacon, a third poll wireless signal, the third poll wireless signal having a third poll transmission speed; receiving, using the third beacon, a third response wireless signal from the passenger mobile device in response to the third poll wireless signal, the third response wireless signal having a third response transmission speed; determining a third time of flight between transmission of the third poll wireless signal from the third beacon and receipt of the third response wireless signal at the third beacon; calculating a third distance between the third beacon and the passenger mobile device based on the third time of flight, the third poll transmission speed, and the third response transmission speed; and determining the location of the passenger mobile device based on at least the first distance, the second distance, and the third distance.

In addition to one or more of the features described herein, or as an alternative, further embodiments may include that determining the location of the passenger mobile device based on at least the first distance, the second distance, and the third distance further includes: triangulating the location of the passenger mobile device based on at least the first distance, the second distance, and the third distance.

In addition to one or more of the features described herein, or as an alternative, further embodiments may include determining a first phase of the first response wireless signal using two antennas of the first beacon; and determining a first angle of approach of a passenger carrying the passenger mobile device based on whether there is a phase delay present in the first response wireless signal.

In addition to one or more of the features described herein, or as an alternative, further embodiments may include: transmitting, using the first beacon, a second poll wireless signal, the first poll wireless signal having a second poll transmission speed; receiving, using the first beacon, a second response wireless signal from the passenger mobile device in response to the second poll wireless signal, the second response wireless signal having a second response transmission speed; determining a second time of flight between transmission of the second poll wireless signal from the first beacon and receipt of the second response wireless signal at the first beacon; calculating a second distance between the first beacon and the passenger mobile device based on the second time of flight, the second poll transmission speed, and the second response transmission speed; and determining a walking speed and direction of the passenger carrying the passenger mobile device based on at least the first distance, the second distance, and a time between calculation of the first distance and the second distance.

In addition to one or more of the features described herein, or as an alternative, further embodiments may include: transmitting, using the first beacon, a second poll wireless signal, the first poll wireless signal having a second poll transmission speed; receiving, using the first beacon, a second response wireless signal from the passenger mobile device in response to the second poll wireless signal, the second response wireless signal having a second response transmission speed; determining a second time of flight between transmission of the second poll wireless signal from the first beacon and receipt of the second response wireless signal at the first beacon; calculating a second distance between the first beacon and the passenger mobile device based on the second time of flight, the second poll transmission speed, and the second response transmission speed; determining a second phase of the second response wireless signal using the two antennas of the first beacon; determining a second angle of approach of a passenger carrying the passenger mobile device based on whether there is a phase delay present in the second response wireless signal; and determining a walking speed and direction of the passenger carrying the passenger mobile device based on at least the first distance, the second distance, the first angle of approach, the second angle of approach, and a time between calculation of the first distance and the second distance.

According to another embodiment, an elevator call system for calling an elevator car of the elevator call system is provided. The elevator call system including: a first beacon in electronic communication with the dispatcher, the first beacon including: a first processor; and a first memory including a first list of computer-executable instructions that, when executed by the first processor, cause the first processor to perform a first set of operations, the first set of operations including: receiving, using a dispatcher of the elevator system, an elevator call from a passenger mobile device; transmitting, using a first beacon, a first poll wireless signal, the first poll wireless signal having a first poll transmission speed; receiving, using the first beacon, a first response wireless signal from a passenger mobile device in response to the first poll wireless signal, the first response wireless signal having a first response transmission speed; determining a first time of flight between transmission of the first poll wireless signal from the first beacon and receipt of the first response wireless signal at the first beacon; and calculating a first distance between the first beacon and the passenger mobile device based on the first time of flight, the first poll transmission speed, and the first response transmission speed. The elevator call system is configured to determine a location of the passenger mobile device based on at least the first distance.

In addition to one or more of the features described herein, or as an alternative, further embodiments may include that the dispatcher is configured to command the elevator car to move to the location of the passenger mobile device.

In addition to one or more of the features described herein, or as an alternative, further embodiments may include that the first poll wireless signal and the first response wireless signal are each Ultra-Wideband wireless signals.

In addition to one or more of the features described herein, or as an alternative, further embodiments may include a second beacon in electronic communication with the dispatcher, the second beacon including: a second processor; and a second memory including a second list of computer-executable instructions that, when executed by the second processor, cause the second processor to perform a second set of operations, the second set of operations including: transmitting, using a second beacon, a second poll wireless signal, the second poll wireless signal having a second poll transmission speed; receiving, using the second beacon, a second response wireless signal from the passenger mobile device in response to the second poll wireless signal, the second response wireless signal having a second response transmission speed; determining a second time of flight between transmission of the second poll wireless signal from the second beacon and receipt of the second response wireless signal at the second beacon; and calculating a second distance between the second beacon and the passenger mobile device based on the second time of flight, the second poll transmission speed, and the second response transmission speed. The elevator call system is configured to determine the location of the passenger mobile device based on at least the first distance and the second distance.

In addition to one or more of the features described herein, or as an alternative, further embodiments may include a third beacon in electronic communication with the dispatcher, the third beacon including: a third processor; and a third memory including a third list of computer-executable instructions that, when executed by the third processor, cause the third processor to perform a third set of operations, the third set of operations including: transmitting, using a third beacon, a third poll wireless signal, the third poll wireless signal having a third poll transmission speed; receiving, using the third beacon, a third response wireless signal from the passenger mobile device in response to the third poll wireless signal, the third response wireless signal having a third response transmission speed; determining a third time of flight between transmission of the third poll wireless signal from the third beacon and receipt of the third response wireless signal at the third beacon; and calculating a third distance between the third beacon and the passenger mobile device based on the third time of flight, the third poll transmission speed, and the third response transmission speed. The elevator call system is configured to determine the location of the passenger mobile device based on at least the first distance, the second distance, and the third distance.

In addition to one or more of the features described herein, or as an alternative, further embodiments may include that the location of the passenger mobile device is determined by triangulating the location of the passenger mobile device based on at least the first distance, the second distance, and the third distance.

In addition to one or more of the features described herein, or as an alternative, further embodiments may include that the first set of operations further include: determining a first phase of the first response wireless signal using two antennas of the beacon. The elevator call system is configured to determine an angle of approach of a passenger carrying the passenger mobile device based on whether there is a phase delay in the first response wireless signal.

In addition to one or more of the features described herein, or as an alternative, further embodiments may include that the first set of operations further include: transmitting, using the first beacon, a second poll wireless signal, the first poll wireless signal having a second poll transmission speed; receiving, using the first beacon, a second response wireless signal from the passenger mobile device in response to the second poll wireless signal, the second response wireless signal having a second response transmission speed; determining a second time of flight between transmission of the second poll wireless signal from the first beacon and receipt of the second response wireless signal at the first beacon; and calculating a second distance between the first beacon and the passenger mobile device based on the second time of flight, the second poll transmission speed, and the second response transmission speed. The elevator call system is configured to determine a walking speed and direction of the passenger carrying the passenger mobile device based on at least the first distance, the second distance, and a time between calculation of the first distance and the second distance.

According to another embodiment, a computer program product embodied on a non-transitory computer readable medium is provided. The computer program product including instructions that, when executed by a processor, cause the processor to perform operations including: transmitting, using a first beacon, a first poll wireless signal, the first poll wireless signal having a first poll transmission speed; receiving, using the first beacon, a first response wireless signal from the passenger mobile device in response to the first poll wireless signal, the first response wireless signal having a first response transmission speed; determining a first time of flight between transmission of the first poll wireless signal from the first beacon and receipt of the first response wireless signal at the first beacon; calculating a first distance between the first beacon and the passenger mobile device based on the first time of flight, the first poll transmission speed, and the first response transmission speed; and determining a location of the passenger mobile device based on at least the first distance.

In addition to one or more of the features described herein, or as an alternative, further embodiments may include that the operations further include: moving an elevator car to the location of the passenger mobile device.

In addition to one or more of the features described herein, or as an alternative, further embodiments may include that the operations further include: determining a phase of the first response wireless signal using two antennas of the first beacon; and determining an angle of approach of a passenger carrying the passenger mobile device based on whether there is a phase delay is present in the first response wireless signal.

Technical effects of embodiments of the present disclosure include determining a location of a passenger for an elevator call based upon a time of flight of wireless signals between a beacon and a passenger mobile device belonging to the passenger.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 3 is a flow chart of a method for calling an elevator car of an elevator system, in accordance with an embodiment of the disclosure.

DETAILED DESCRIPTION

Elevator systems are typically only able to generate an elevator call based on an individual manually entering an elevator call using a call button on a wall next to an elevator bank. Elevator calls may now be made through applications of mobile devices. The elevator calls may be made automatically by the application or entered manually into the application by an individual. When the elevator call is placed, a dispatcher of the elevator system would need to know where the individual is located in order to send an elevator car to pick up the individual. For example, the dispatcher would need to know what floor (i.e., landing) the individual is on and which elevator bank the individual is near in order to assign an elevator car of the correct elevator bank and send said elevator car to the correct landing. Previously, the elevator call buttons were located on the wall next to the elevator bank and thus this was not an issue, but now with the ability to place elevator calls through mobile devices, knowing where to send elevator cars to pick-up passengers becomes more challenging. The embodiments disclosed herein relate to an elevator call system that uses beacons (i.e., wireless nodes) to properly locate an individual that has entered an elevator call and determine what elevator bank they will utilize and on what landing they will board the elevator system.

Figure 1:
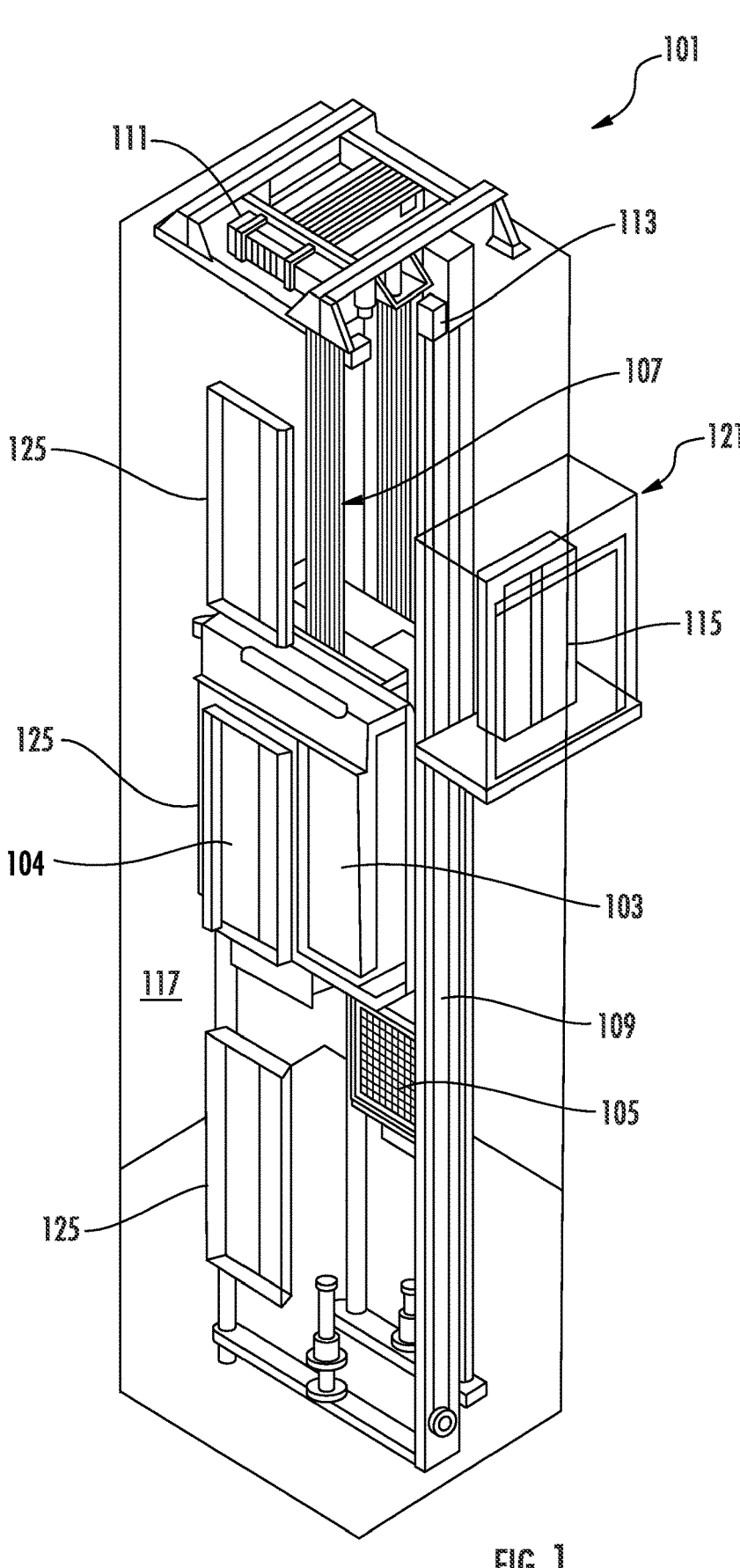
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor or pinched wheel propulsion to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

The elevator system 101 also includes one or more elevator doors 104. The elevator door 104 may be integrally attached to the elevator car 103. There may also be an additional elevator door 104 located on a landing 125 of the elevator system 101 (see FIG. 2).

Figure 2:
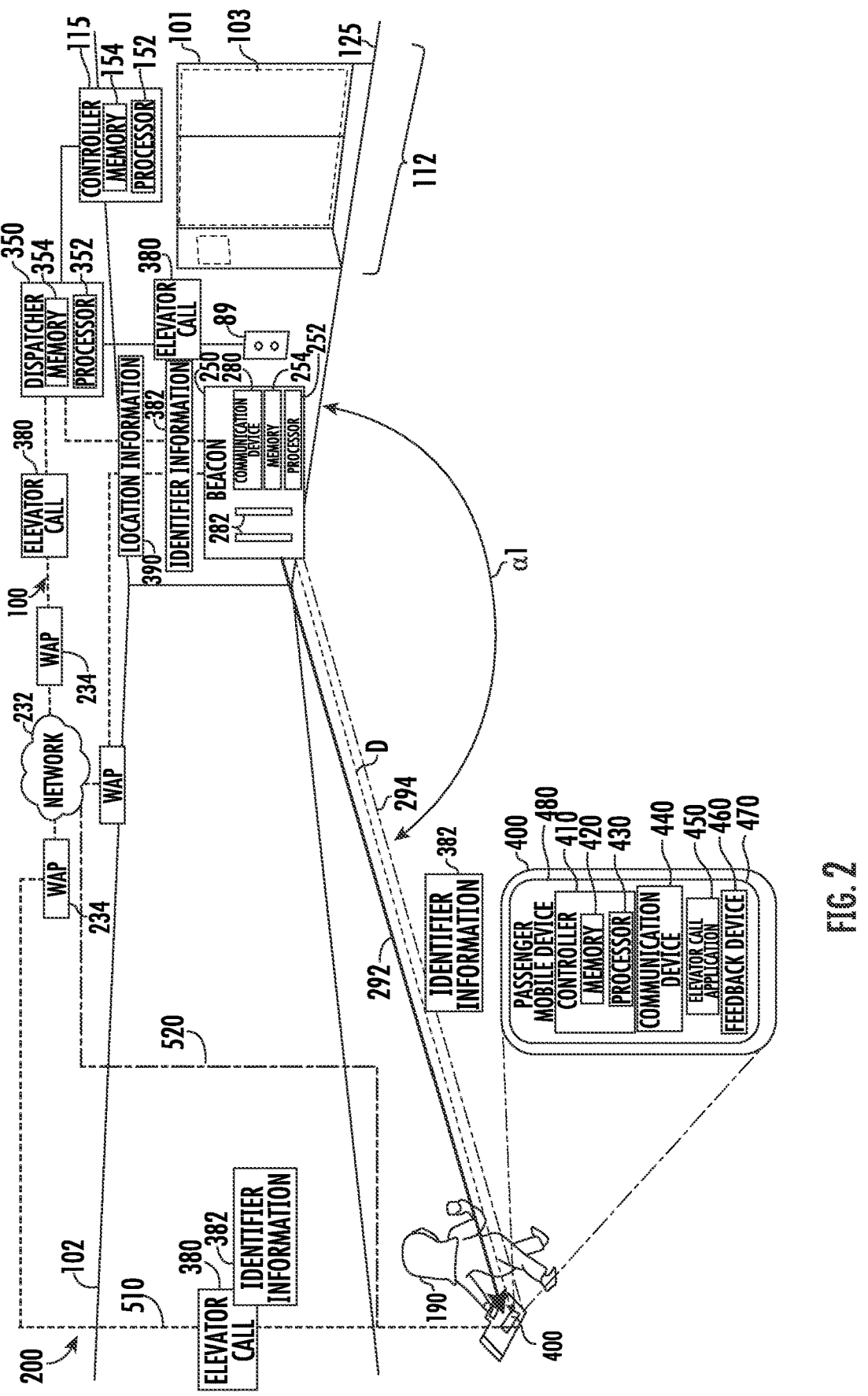
FIG. 2 illustrates a schematic view of an elevator call system used to generate elevator calls based on a detected location of a passenger mobile device in relation to a beacon, in accordance with an embodiment of the disclosure.

Referring now to FIG. 2, with continued reference to FIG. 1, an elevator call system 200 is illustrated, in accordance with an embodiment of the present disclosure. It should be appreciated that, although particular systems are separately defined in the schematic block diagrams, each or any of the systems may be otherwise combined or separated via hardware and/or software.

The elevator call system 200 includes and/or is in wired or wireless communication with one or more beacons 250 (i.e., wireless nodes). It is understood that while one beacon 250 is illustrated, the embodiments disclosed herein may be applicable to an elevator call system 200 having one or more beacons 250 (see FIG. 4). The beacon 250 may be configured to act as an extension of the building elevator group system 100 by collecting data for the building elevator system 101 and transmitting elevator data to a dispatcher 350 of the building elevator group system 100. The beacon 250 may be an Ultra-Wideband wireless beacon capable of transmitting wireless signals via Ultra-Wideband. The beacon 250 may also be transmitting any wireless signal capable of time of flight calculations.

The beacon 250 is configured to emit a poll wireless signal 292 detectable by a passenger mobile device 400 of passenger 190 in order to determine a location of the passenger 190. The passenger mobile device 400 is configured to transmit a response wireless signal 294 back to the beacon 250 in response to the poll wireless signal 292. The passenger mobile device 400 is configured to transmit the response wireless signal 294 back to the beacon 250 in response to the poll wireless signal 292 near instantaneously after receiving the poll wireless signal 292. The poll wireless signal 292 may also be referred to as a request wireless signal. The beacon 250 is capable of two-way Ultra-Wideband communication and may also be configured to receive elevator calls 380 from passenger mobile device 400.

As illustrated in FIG. 2, a building elevator group system 100 within a building 102 may include one or more individual elevator systems 101 organized in elevator banks 112 on a landing(s) 125 (i.e., floor of the building 102). It is understood that while a single elevator system 101 is illustrated in a single elevator bank 112, the elevator bank 112 may comprise any number of elevator systems 101 and there may be one or more elevator banks 112. The elevator system 101 illustrated in FIG. 2 may be a single deck elevator system (e.g., one elevator car) or a double-deck elevator system. The elevator system 101 of FIG. 2 includes an elevator car 103. The elevator car 103 may serve any number of landings 125.

The landing 125 in the building 102 of FIG. 2 may have an elevator call device 89 located proximate the elevator system 101. The elevator call device 89 is configured to transmit an elevator call 380 to a dispatcher 350 of the building elevator group system 100. It should be appreciated that, although the dispatcher 350 is separately defined in the schematic block diagrams, the dispatcher 350 may be combined via hardware and/or software in the controller 115 or any other device. The elevator call 380 may include the source location of the elevator call device 89. The elevator call device 89 may include a destination entry option that includes the destination of the elevator call 380. The elevator call device 89 may be a push button and/or a touch screen and may be activated manually or automatically. For example, the elevator call 380 may be sent by the passenger 190.

A passenger mobile device 400 is configured to transmit an elevator call 380 and the passenger 190 may be in possession of said passenger mobile device 400 to transmit the elevator call 380. The passenger mobile device 400 may belong to the passenger 190 that is a passenger, a potential passenger, a future passenger, or a previous passenger of the elevator system 101. The passenger 190 may utilize an elevator call application 450 through a passenger mobile device 400 to make an elevator call 380 or an elevator call 380 may be made automatically by the elevator call application 450. The elevator call 380 sent from the elevator call application 450 may include identifier information 382 that indicates what passenger mobile device 400 and/or passenger 190 has transmitted the elevator call 380. The elevator call application 450 may be installed on the passenger mobile device 400 or accessed via the network 232, internet, web browser, or some other known portal through the passenger mobile device 400, such as, for example a software-as-a service.

The passenger mobile device 400 may be a mobile computing device that is typically carried by a person, such as, for example a phone, a smart phone, a PDA, a smart watch, a tablet, a laptop, or any other mobile computing device known to one of skill in the art. In an embodiment, the passenger mobile device 400 is a smart phone.

The passenger mobile device 400 includes a controller 410 configured to control operations of the passenger mobile device 400. The controller 410 may be an electronic controller including a processor 430 and an associated memory 420 comprising computer-executable instructions (i.e., computer program product) that, when executed by the processor 430, cause the processor 430 to perform various operations. The processor 430 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 420 may be but is not limited to a random access memory (RAM), read only memory (ROM), or other electronic, optical, magnetic or any other computer readable medium.

The passenger mobile device 400 includes a communication device 440 configured to communicate with the WAP 234 or a beacon 250 through one or more wireless signals. The one or more wireless signals may include Bluetooth, BLE, Wi-Fi, HaLow (801.11ah), zWave, ZigBee, ultra-wideband (UWB), Wireless M-Bus, cellular, any wireless signal capable of time of flight calculations, or any other short-range wireless protocol known to one of skill in the art.

The passenger mobile device 400 may include a display device 480, such as for example a computer display, an LCD display, an LED display, an OLED display, a touchscreen of a smart phone, or any other similar display device known to one of the skill in the art. The passenger 190 operating the passenger mobile device 400 is able to view the elevator call application 450 through the display device 480.

The passenger mobile device 400 includes an input device 470 configured to receive a manual input from the passenger 190 (e.g., human being) of mobile device 400. The input device 470 may be a keyboard, a touch screen, a joystick, a knob, a touchpad, one or more physical buttons, a microphone configured to receive a voice command, a camera or sensor configured to receive a gesture command, an inertial measurement unit configured to detect a shake of the passenger mobile device 400, or any similar input device known to one of skill in the art. The passenger 190 operating the passenger mobile device 400 is able to enter feedback into the elevator call application 450 through the input device 470. The input device 470 allows the passenger 190 operating the passenger mobile device 400 to enter feedback into the elevator call application 450 via a manual input to input device 470. For example, the passenger 190 may respond to a prompt on the display device 480 by entering a manual input via the input device 470. In one example, the manual input may be a touch on the touchscreen or a voice command into the microphone. In an embodiment, the display device 480 and the input device 470 may be combined into a single device, such as, for example, a touchscreen. There may be more than one input devices 470, such as, for example, a touchscreen, a microphone, and/or a physical button.

The passenger mobile device 400 device may also include a feedback device 460. The feedback device 460 may activate in response to a manual input via the input device 470. The feedback device 460 may be a haptic feedback vibration device and/or a speaker emitting a sound. The feedback device 460 device may activate to confirm that the manual input entered via the input device 470 was received via the elevator call application 450. For example, the feedback device 460 device may activate by emitting an audible sound or vibrate the passenger mobile device 400 to confirm that the manual input entered via the input device 470 was received via the elevator call application 450.

The passenger 190 may enter the elevator call 380 using a keypad, physical button, or touchscreen of the passenger mobile device 400. The display device 480 may also act as a touch screen. The passenger 190 may also enter the elevator call 380 via a voice command that is received by a microphone of the passenger mobile device 400.

The controller 115 is configured to control and coordinate operation of an elevator system 101. The controller 115 may be an electronic controller including a processor 152 and an associated memory 154 comprising computer-executable instructions that, when executed by the processor 152, cause the processor 152 to perform various operations. The processor 152 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 154 may be but is not limited to a random access memory (RAM), read only memory (ROM), or other electronic, optical, magnetic or any other computer readable medium.

The dispatcher 350 is configured to control and coordinate operation of one or more elevator systems 101 in one or more elevator banks 112. The dispatcher 350 may be an electronic controller including a processor 352 and an associated memory 354 comprising computer-executable instructions that, when executed by the processor 352, cause the processor 352 to perform various operations. The processor 352 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 354 may be but is not limited to a random access memory (RAM), read only memory (ROM), or other electronic, optical, magnetic or any other computer readable medium.

The controller 115 can be local, remote, cloud, etc. The dispatcher 350 may be local, remote, cloud, etc. The dispatcher 350 is in communication with the controller 115 of each elevator system 101. The dispatcher 350 may be a 'group' software that is configured to control the elevator system 101.

The dispatcher 350 is in communication with the elevator call device 89 of the building elevator group system 100. The dispatcher 350 is configured to receive the elevator call 380 transmitted from the elevator call device 89, beacon 250, and/or the passenger mobile device 400. The dispatcher 350 is configured to manage the elevators calls 380 coming in from the elevator call device 89, beacon 250, and/or the passenger mobile device 400 then command one or more elevator systems 101 to respond to elevator call 380.

The passenger mobile device 400 may be configured to transmit the elevator call 380 to the dispatcher 350. The passenger mobile device 400 may be configured to transmit the elevator call 380 through a wireless access protocol device (WAP) 234 to the Network 232 via Wi-Fi 510 and then to the dispatcher 350. Alternatively, the passenger mobile device 400 may be configured to transmit the elevator call 380 through to the Network 232 via cellular data (e.g., 5G) 520 and then to the dispatcher 350.

The dispatcher 350 is configured to receive the elevator call 380 transmitted from the passenger mobile device 400. Once the dispatcher 350 receives the elevator call 380 the beacon 250 may be commanded to transmit the poll wireless signal 292 to the passenger mobile device 400 that transmitted the elevator call 380 in order to determine the location of the passenger mobile device 400. Before, during and/or after the transmission of an elevator call 380 from the passenger mobile device 400, the elevator call application 450 may command the communication device 440 to search for the poll wireless signal 292 of the beacon 250.

The beacon 250 may be configured to emit a poll wireless signal 292 from a communication device 280 using Ultra-Wideband or any wireless signal capable of time of flight calculations. The poll wireless signal 292 is detected by the passenger mobile device 400 and the passenger mobile device 400 is configured to transmit a response wireless signal 294 from the communication device using Ultra-Wideband. The beacon 250 is configured to detect the time of flight of the poll wireless signal 292 and the response wireless signal 294. The time of flight is the time it takes for the poll wireless signal 292 to be transmitted from the beacon 250 to the passenger mobile device 400 and the time it takes for the response wireless signal 294 to be transmitted from the passenger mobile device 400 to the beacon 250. The poll wireless signal 292 and the response wireless signal 294 are Ultra-Wideband signals having a known time delay from poll to response and a known speed of the signal, being the speed of light. Since the speed of the poll wireless signal 292 and the response wireless signal 294 is known and the time of flight is detected then a distance D between the beacon 250 and the passenger mobile device 400 may be calculated using the speed of the poll wireless signal 292 and the response wireless signal 294 and the time of flight. The beacon 250 is configured to measure the time from the outgoing poll wireless signal 292 and when the response wireless signal 294 is received back to the beacon 250, then taking the measured time and subtract the processing time delay that takes place within the communication device 440 of passenger mobile device 400, divide the result by 2, and then multiply by the speed of light to get distance D between the beacon 250 and the passenger mobile device 400.

Advantageously, utilization of Ultra-Wideband to determine the distance between the beacon 250 and the passenger mobile device 400 is more accurate than utilizing received signal strength indicators (RSSI) of wireless signals. The RSSI values of a beacon signal will vary depending on the model of the passenger mobile device 400 (e.g., phone) since every antenna is different, thus RSSI is not as accurate. Using time of flight relies on the constant speed of light and an accurate timer, which every passenger mobile device 400 (e.g., phone) has the processing power to handle fast timing. Due to the consistent means of measurement that is utilized the passenger mobile device 400 (e.g., phone) will output consistent data along all different phone models.

Also, advantageous, by utilizing Ultra-Wideband to communicate with the passenger mobile device 400 the beacon 250, the beacon 250 is also capable of determining additional information about the passenger mobile device 400, such as, for example, a walking speed of the passenger 190 carrying the passenger mobile device 400, angle of approach α1 of the passenger 190 carrying the passenger mobile device 400. By repeatedly getting the distance between the passenger mobile device 400 and the beacon 250 at a known polling rate, the beacon 250 can measure the difference in the distance relative to the polling time and calculate the speed. This data can also be used in conjunction with data already gathered by the sensors of the passenger mobile device 400, such as an accelerometer The angle of approach α1 of the passenger 190 carrying the passenger mobile device 400 may be determined by comparing the wireless signal phase shift between the poll wireless signal 292 and the response wireless signal 294.

The communication device 280 of the beacon 250 can have two antennas 282 at a known spacing from one another and a known orientation the wall of the beacon 250. When the response wireless signal 294 is received, each antenna 282 will detect the response wireless signal 294 at different time and the message will be "seen" at a different phase, unless the passenger 190 is directly perpendicular to the antennas 282 of the beacon 250 in which case the phase is the same for both antennas 282. This is due to the constant speed of light and the constant frequency of the response wireless signal 294. The antenna 282 of the beacon 250 that is closest to the passenger 190 will detect the response wireless signal 294 first, and the other antenna 282 will see everything slightly delayed. Since the distance between the antennas 282 is known, it is possible to time the difference of the response wireless signals 294 and calculate the angle. This may be used in conjunction with sensors on the passenger mobile device 400 to provide data, such as accelerometer, compass, and/or GPS.

The response wireless signal 294 may include the identifier information 382 to identify which passenger mobile device is transmitted the response wireless signal 294, so that the beacon 250 and/or the dispatcher 350 can associate the response wireless signal 294 with an elevator call received. It is understood that the response wireless signal 294 may not include the identifier information.

Once the distance D, angle of approach α1, or distance D and angle of approach α1 is determined between the beacon 250 and the passenger mobile device 400. The distance D may be transmitted as location information 390 to the dispatcher 350 from the beacon 250. The beacon may also be configured to transmit the identifier information 382 to the dispatcher 350. Once the distance D is determined, another implementation may be to transmit this data back to the mobile device 400 such that location information 390 might be part of the elevator call 380 over wireless signals on Wi-Fi 510 or cellular data 520.

The location information 390 from the beacon 250 may also include what landing 125 (i.e., floor) the beacon 250 is located on and what elevator bank 112 the beacon 250 is located near or what elevator bank 112 the beacon 250 belongs to. For example, the beacon 250 may be located at the front door of a building 102 and belong to an elevator bank 112 on the first floor/landing 125 on the other side of the building 102. The location information 390 may further include additional information about the passenger 190 carrying the passenger mobile device 400, including, but not limited to, a walking speed of the passenger 190 carrying the passenger mobile device 400, angle of approach α1 of the passenger 190 carrying the passenger mobile device 400.

The beacon 250 may be configured to receive identifier information 382 from the passenger mobile device 400 and transmit the location information 390 and the identifier information 382 to the dispatcher 350.

There may be a beacon 250 located at or proximate the elevator bank 112. It is understood that while FIG. 2 illustrates a single beacon 250 located proximate the elevator bank 112, the embodiments described herein are applicable to one or more beacons 250 located anywhere inside or outside the building 102. For example, the beacons 250 may be located in a parking garage, parking lot, a lobby, a door, a hallway, a meeting room, a cafeteria, or any other possible location inside or outside of the building. Multiple beacons may be utilized to help triangulate a position of the passenger mobile device 400.

A beacon 250 may be located at the elevator bank 112 to confirm when the passenger 190 is proximate the elevator bank 112, which may confirm that the individual intends to use the elevator system 101.

The beacon 250 includes a processor 252 and an associated memory 254 including computer-executable instructions that, when executed by the processor 252, cause the processor 252 to perform various operations. The processor 252 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 254 may be a storage device such as, for example, a random access memory (RAM), read only memory (ROM), or other electronic, optical, magnetic or any other computer readable medium.

The beacon 250 includes a communication device 280 configured to allow the beacon 250 emit the poll wireless signal 292. The beacon 250 may also be capable of communicating with the dispatcher 350. The communication device 280 is capable of transmitting and receiving data to and from the dispatcher 350 through a computer network 232. The computer network 232 may be a cloud computing network or the internet. In another embodiment, the communication device 280 is capable of transmitting and receiving data to and from the dispatcher 350 by communicating directly with the dispatcher 350. The communication device 280 may alternatively or additionally be connected to the dispatcher 350 through a wired connection. In another embodiment, the beacon 250 may be incorporated within elevator call device 89 and can communicate to the dispatcher 350 through a wired communication shared by the elevator call device 89.

The communication device 280 may alternatively communicate to the computer network 232 through the (WAP) 234 using short-range wireless protocols. Short-range wireless protocols may include, but not are limited to, Bluetooth, Wi-Fi, HaLow (801.11ah), zWave, ZigBee, Ultra-Wideband, Wireless M-Bus, or any other short-range wireless protocol known to one of skill in the art. Alternatively, the communication device 280 may communicate directly with the computer network 232 using long-range wireless protocols. Long-range wireless protocols may include, but are not limited to, cellular, LTE (NB-IoT, CAT M1), LoRa, satellite, Ingenu, or SigFox.

The communication device 280 may communicate to the dispatcher 350 through a WAP 234 using short-range wireless protocols. Alternatively, the communication device 280 may communicate directly with the dispatcher 350 using short-range wireless protocols. The communication device 280 is configured to communicate with the passenger mobile device 400 using Ultra-Wideband.

Figure 4:
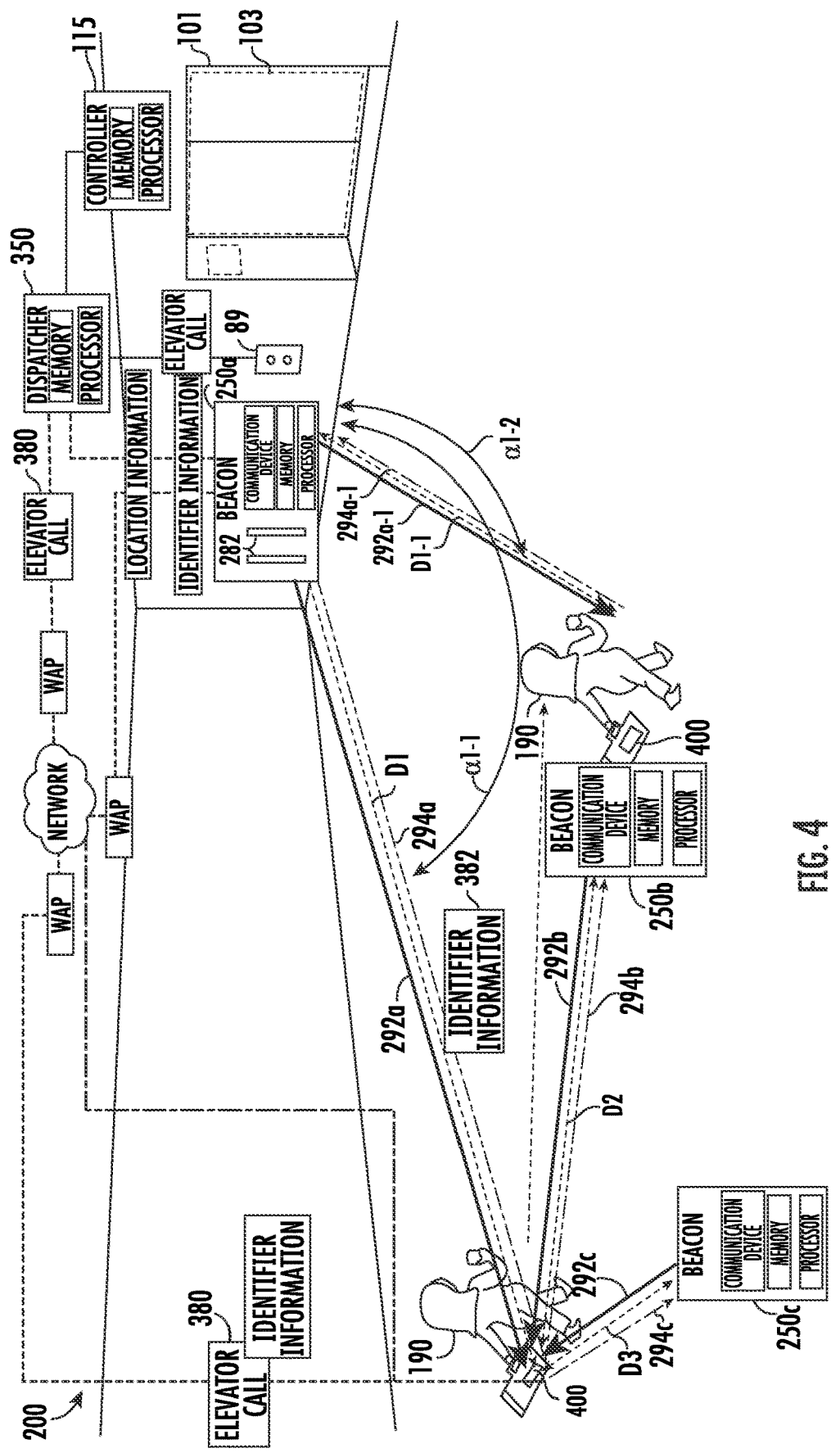
FIG. 4 illustrates a schematic view of an elevator call system used to generate elevator calls based on a detected location of a passenger mobile device in relation to one or more beacons, in accordance with an embodiment of the disclosure.

Referring now to FIGS. 3 and 4, with continued reference to FIGS. 1 and 2, a flow chart of a method 800 for calling an elevator car 103 of an elevator system 101 is illustrated in FIG. 3 and an elevator call system 200 is illustrated in FIG. 4, in accordance with an embodiment of the disclosure. The elevator call system 200 of FIG. 4 is similar to the elevator call system 200 with many of the same components. The major difference between the elevator call system of FIG. 4 is that the elevator call system of FIG. 4 contains three beacons 250 including a first beacon 250a, a second beacon 250b, and a third beacon 250c. It is understood that while the elevator call system 200 of FIG. 4 illustrates three beacons 250a, 250b, 250c, blocks 804-814 of method 800 are capable of being performed by an elevator call system 200 with one or more beacons 250 and the additional steps described in association with method 800 may be performed by an elevator call system 200 with one or more beacons 250 unless described otherwise hereinafter. In an embodiment, the method 800 is performed by the elevator call system 200. Here after the method 800 of FIG. 3 will be described in association with the elevator call system 200 of FIG. 4.

At block 804, an elevator call 380 is received from a passenger mobile device 400. Block 804 may not be necessary and may be an optional step. For example, the beacon 250 may be continuously tracking a location of the passenger mobile device 400 and thus may not wait for an elevator call 380 to be received in order to track the passenger mobile device 400. Alternatively block 804 may be performed after the location is determined in block 814.

At block 806, a first beacon 250a transmits a first poll wireless signal 292a. The first poll wireless signal 292a has a first poll transmission speed. The first poll transmission speed may be equivalent or about equivalent to the speed of light.

At block 808, the first beacon 250a receives a first response wireless signal 294a from the passenger mobile device 400 in response to the first poll wireless signal 292a, the first response wireless signal 294a has a first response transmission speed. The first response transmission speed may be equivalent or about equivalent to the speed of light. In an embodiment, the first poll wireless signal 292a and the first response wireless signal 294a are each Ultra-Wideband wireless signals.

At block 810, a first time of flight between transmission of the first poll wireless signal 292a from the first beacon 250a and receipt of the first response wireless signal 294a at the first beacon 250a is determined. The communication device 280 of the beacon 250 may be configured to determine the time of flight.

At block 812, a first distance D1 between the first beacon 250a and the passenger mobile device 400 is calculated based on the first time of flight, the first poll transmission speed, and the first response transmission speed. The communication device 280 or the processor 252 of the beacon 250 may be configured to determine the first distance D1.

At block 814, a location of the passenger mobile device 400 is determined based on at least the first distance D1.

The method 800 may further include that the elevator car 103 is moved to the location of the passenger mobile device 400. The dispatcher 350 may command that the controller 115 of the elevator system 101 move the elevator car 103.

The method 800 may further include that a second beacon 250b transmits a second poll wireless signal 292b, the second poll wireless signal 292b has a second poll transmission speed. The second beacon 250b may then receive a second response wireless signal 294b from the passenger mobile device 400 in response to the second poll wireless signal 292b. The second response wireless signal 294b has a second response transmission speed. The second poll transmission speed and the second response transmission speed may be equivalent to or about equivalent to the speed of light. A second time of flight between transmission of the second poll wireless signal 292b from the second beacon 250b and receipt of the second response wireless signal 294b at the second beacon 250b may then be determined. Next a second distance D2 between the second beacon 250b and the passenger mobile device 400 may be calculated based on the second time of flight, the second poll transmission speed, and the second response transmission speed. The location of the passenger mobile device 400 may be determined based on at least the first distance D1 and the second distance D2.

The method 800 may also further include that a third beacon 250c transmits a third poll wireless signal 292c. The third poll wireless signal 292c has a third poll transmission speed. The method 800 may next include that the third beacon 250c receives a third response wireless signal 294c from the passenger mobile device 400 in response to the third poll wireless signal 292c. The third response wireless signal 294c has a third response transmission speed. The third poll transmission speed and the third response transmission speed may be equivalent to or about equivalent to the speed of light. A third time of flight between transmission of the third poll wireless signal 292c from the third beacon 250c and receipt of the third response wireless signal 294c at the third beacon 250c may then be determined. A third distance D3 between the third beacon 250c and the passenger mobile device 400 may be calculated based on the third time of flight, the third poll transmission speed, and the third response transmission speed. The location of the passenger mobile device 400 may be determined based on at least the first distance D1, the second distance D2, and the third distance D3. The location of the passenger mobile device 400 may be triangulated based on at least the first distance D1, the second distance D2, and the third distance D3.

The method 800 may also include that a phase of the first response wireless signal 294a is determined using two different antennas 282 of the first beacon 250a. Then is may be determined whether there is a phase delay in the first response wireless signal 294a. Then it may be determined that a first angle of approach α1-1 of a passenger carrying the passenger mobile device 400 based on whether a phase delay is present in the first response wireless signal 294a. The first angle of approach α1-1 is measured at the first distance D1.

The method 800 may further include that the first beacon 250a transmits a second poll wireless signal 292a-1. The second poll 292a-1 wireless signal has a second poll transmission speed. Next, the first beacon 250a receives a second response wireless signal 294a-1 from the passenger mobile device 400 in response to the second poll wireless signal 292a-1. The second response wireless signal 292-1 has a second response transmission speed. The second poll transmission speed and the second response transmission speed may be equivalent to or about equivalent to the speed of light. Next, a second time of flight between transmission of the second poll wireless signal 292a-1 from the first beacon 250a and receipt of the second response wireless signal 294a-1 at the first beacon 250a may be determined. Then a second distance D1-1 between the first beacon 250a and the passenger mobile device 400 may be calculated based on the second time of flight, the second poll transmission speed, and the second response transmission speed.

The method 800 may also include that a phase of the second response wireless signal 294a-1 is determined using two different antennas 282 of the first beacon 250a. Then is may be determined whether there is a phase delay in the second response wireless signal 294a-1. Then it may be determined that a second angle of approach α1-2 of a passenger carrying the passenger mobile device 400 based on whether a phase delay is present in the second response wireless signal 294a-1. The second angle of approach α1-2 is measured at the second distance D1-2.

A walking speed of the passenger 190 carrying the passenger mobile device 400 may then be determined based on at least the first distance D1, the second distance D1-1, a time between calculation of the first distance D1 and the second distance D1-1, the first angle of approach α1-1 at the first distance D1, and the second angle of approach α1-2 at the second distance D1-1. It should be noted that the if the angle of approach α1 does not change from the first distance D1 to the second distance D1-1, then the angle of approach α1 does not need to be taken into account when calculating walking speed of the passenger 190. The walking speed and direction of travel may help the dispatcher 350 determine when to have the elevator car 103 arrive to pick up the passenger 190.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of calling an elevator car for an elevator system, the method comprising:

transmitting, using a first beacon, a first poll wireless signal;

receiving, using the first beacon, a first response wireless signal from a passenger mobile device in response to the first poll wireless signal;

determining a first time of flight between transmission of the first poll wireless signal from the first beacon and receipt of the first response wireless signal at the first beacon;

calculating a first distance between the first beacon and the passenger mobile device based on the first time of flight;

determining a location of the passenger mobile device based on at least the first distance;

receiving an elevator call from the passenger mobile device.

2. The method of claim 1, further comprising:

moving the elevator car to the location of the passenger mobile device.

3. The method of claim 1, wherein the first poll wireless signal and the first response wireless signal are each Ultra-Wideband wireless signals.

4. The method of claim 1, further comprising:

transmitting, using a second beacon, a second wireless signal;

receiving, using the second beacon, a second response wireless signal from the passenger mobile device in response to the second poll wireless signal;

determining a second time of flight between transmission of the second poll wireless signal from the second beacon and receipt of the second response wireless signal at the second beacon;

calculating a second distance between the second beacon and the passenger mobile device based on the second time of flight; and determining the location of the passenger mobile device based on at least the first distance and the second distance.

5. The method of claim 4, further comprising:

transmitting, using a third beacon, a third poll wireless signal;

receiving, using the third beacon, a third response wireless signal from the passenger mobile device in response to the third poll wireless signal;

determining a third time of flight between transmission of the third poll wireless signal from the third beacon and receipt of the third response wireless signal at the third beacon;

calculating a third distance between the third beacon and the passenger mobile device based on the third time of flight; and determining the location of the passenger mobile device based on at least the first distance, the second distance, and the third distance.

6. The method of claim 5, wherein determining the location of the passenger mobile device based on at least the first distance, the second distance, and the third distance further comprises:

triangulating the location of the passenger mobile device based on at least the first distance, the second distance, and the third distance.

7. The method of claim 1, further comprising:

determining a first phase of the first response wireless signal using two antennas of the first beacon; and determining a first angle of approach of a passenger carrying the passenger mobile device based on whether there is a phase delay present in the first response wireless signal.

8. The method of claim 1, further comprising:

transmitting, using the first beacon, a second poll wireless signal;

receiving, using the first beacon, a second response wireless signal from the passenger mobile device in response to the second poll wireless signal;

determining a second time of flight between transmission of the second poll wireless signal from the first beacon and receipt of the second response wireless signal at the first beacon;

calculating a second distance between the first beacon and the passenger mobile device based on the second time of flight; and determining a walking speed and direction of the passenger carrying the passenger mobile device based on at least the first distance, the second distance, and a time between calculation of the first distance and the second distance.

9. The method of claim 7, further comprising:

transmitting, using the first beacon, a second poll wireless signal;

receiving, using the first beacon, a second response wireless signal from the passenger mobile device in response to the second poll wireless signal;

determining a second time of flight between transmission of the second poll wireless signal from the first beacon and receipt of the second response wireless signal at the first beacon;

calculating a second distance between the first beacon and the passenger mobile device based on the second time of flight;

determining a second phase of the second response wireless signal using the two antennas of the first beacon;

determining a second angle of approach of a passenger carrying the passenger mobile device based on whether there is a phase delay present in the second response wireless signal; and determining a walking speed and direction of the passenger carrying the passenger mobile device based on at least the first distance, the second distance, the first angle of approach, the second angle of approach, and a time between calculation of the first distance and the second distance.

10. The method of claim 1, further comprising providing the location of the passenger mobile device and the elevator call to a dispatcher.

11. An elevator call system for calling an elevator car of the elevator call system, the elevator call system comprising:

a first beacon in electronic communication with a dispatcher, the first beacon comprising:

a first processor; and a first memory comprising a first list of computer-executable instructions that, when executed by the first processor, cause the first processor to perform a first set of operations, the first set of operations comprising:

receiving, using the dispatcher, an elevator call from a passenger mobile device;

transmitting, a first poll wireless signal;

receiving, a first response wireless signal from a passenger mobile device in response to the first poll wireless signal;

determining a first time of flight between transmission of the first poll wireless signal from the first beacon and receipt of the first response wireless signal at the first beacon; and calculating a first distance between the first beacon and the passenger mobile device based on the first time of flight, wherein the elevator call system is configured to determine a location of the passenger mobile device based on at least the first distance.

12. The elevator call system of claim 11, wherein the dispatcher is configured to command the elevator car to move to the location of the passenger mobile device.

13. The elevator call system of claim 11, wherein the first poll wireless signal and the first response wireless signal are each Ultra-Wideband wireless signals.

14. The elevator call system of claim 11, further comprising:

a second beacon in electronic communication with a dispatcher, the second beacon comprising:

a second processor; and a second memory comprising a second list of computer-executable instructions that, when executed by the second processor, cause the second processor to perform a second set of operations, the second set of operations comprising:

transmitting a second poll wireless signal;

receiving a second response wireless signal from the passenger mobile device in response to the second poll wireless signal;

determining a second time of flight between transmission of the second poll wireless signal from the second beacon and receipt of the second response wireless signal at the second beacon; and calculating a second distance between the second beacon and the passenger mobile device based on the second time of flight, wherein the elevator call system is configured to determine the location of the passenger mobile device based on at least the first distance and the second distance.

15. The elevator call system of claim 14, further comprising:

a third beacon in electronic communication with the dispatcher, the third beacon comprising:

a third processor; and a third memory comprising a third list of computer-executable instructions that, when executed by the third processor, cause the third processor to perform a third set of operations, the third set of operations comprising:

transmitting a third poll wireless signal;

receiving, using the third beacon, a third response wireless signal from the passenger mobile device in response to the third poll wireless signal;

determining a third time of flight between transmission of the third poll wireless signal from the third beacon and receipt of the third response wireless signal at the third beacon; and calculating a third distance between the third beacon and the passenger mobile device based on the third time of flight, wherein the elevator call system is configured to determine the location of the passenger mobile device based on at least the first distance, the second distance, and the third distance.

16. The elevator call system of claim 15, wherein the location of the passenger mobile device is determined by triangulating the location of the passenger mobile device based on at least the first distance, the second distance, and the third distance.

17. The elevator call system of claim 11, wherein the first set of operations further comprise:

determining a first phase of the first response wireless signal using two antennas of the beacon, wherein the elevator call system is configured to determine an angle of approach of a passenger carrying the passenger mobile device based on whether there is a phase delay in the first response wireless signal.

18. The elevator call system of claim 11, wherein the first set of operations further comprise:

transmitting, using the first beacon, a second poll wireless signal;

receiving, using the first beacon, a second response wireless signal from the passenger mobile device in response to the second poll wireless signal;

determining a second time of flight between transmission of the second poll wireless signal from the first beacon and receipt of the second response wireless signal at the first beacon; and calculating a second distance between the first beacon and the passenger mobile device based on the second time of flight, wherein the elevator call system is configured to determine a walking speed and direction of the passenger carrying the passenger mobile device based on at least the first distance, the second distance, and a time between calculation of the first distance and the second distance.

19. A computer program product embodied on a non-transitory computer readable medium, the computer program product including instructions that, when executed by a processor, cause the processor to perform operations comprising:

transmitting, using a first beacon, a first poll wireless signal;

receiving, using the first beacon, a first response wireless signal from a passenger mobile device in response to the first poll wireless signal;

determining a first time of flight between transmission of the first poll wireless signal from the first beacon and receipt of the first response wireless signal at the first beacon;

calculating a first distance between the first beacon and the passenger mobile device based on the first time of flight; and determining a location of the passenger mobile device based on at least the first distance.

20. The computer program product of claim 19, wherein the operations further comprise:

moving an elevator car to the location of the passenger mobile device.

21. The computer program product of claim 19, wherein the operations further comprise:

determining a phase of the first response wireless signal using two antennas of the first beacon; and determining an angle of approach of a passenger carrying the passenger mobile device based on whether there is a phase delay is present in the first response wireless signal.

* * * * *